June 30, 1964  W. M. HAINES, JR., ETAL  3,138,962
POWER TRANSMISSION BELTING
Original Filed June 4, 1958  2 Sheets-Sheet 1

INVENTORS.
WILLIAM M. HAINES JR.
EDWIN PAUL CARTER
BY Raymond Fink
ATTORNEY

3,138,962
POWER TRANSMISSION BELTING
William M. Haines, Jr., Englewood, and Edwin Paul Carter, Denver, Colo., assignors to The Gates Rubber Company, Denver, Colo., a corporation of Colorado
Original application June 4, 1958, Ser. No. 739,829. Divided and this application Mar. 22, 1963, Ser. No. 267,296
11 Claims. (Cl. 74—231)

The present invention relates to an improved power transmission belt construction and to a method for making the same; more particularly, this invention relates to a plastic, reinforced belt construction, and to improved casting procedures for making the same.

The present invention is a division of our co-patent application Serial No. 739,829 filed June 4, 1958. In that application it is explained that the present invention is concerned primarily with the formation and construction of a power transmission belt which exhibits uniformity in dimensions throughout the belt, enables extremely accurate placement of the tensile section and wherein the tensile section may be incorporated into the belt in such a way as to effectively form a unitary belt construction. In the development and manufacture of power transmission belts, reliability and increased life are dependent in large part upon the above factors, together with high tensile strength and favorable flex fatigue characteristics in the load carrying section of the belt, with the load carrying section disposed in firm, tightly adhering relation with the remainder of the belt so as to attain optimum distribution of the stresses into and uniformly throughout this tensile, or load carrying section. Of course, flexibility, wear resistance and impact strength are additional factors involved.

In the past, however, it has been common practice to build power transmission belts in separate layers of different materials, many of the layers being specially treated, especially the tensile section, for proper adherence with the remainder of the belt. Also, prior to building the belt, the fibers or yarns forming the tensile section of the belt are given a certain angle of twist before treatment in order to establish the desired flex fatigue and load carrying properties once incorporated into the belt. However, in practice, it has been found difficult to hold the fibers or yarns in place to maintain the given angle and prevent relative movement with respect to the surrounding area of the belt, and to maintain the desired spacing and placement of the materials forming the tensile section due to the necessity of repeated handling and treating during the building operation. Moreover, proper stress distribution into the tensile section cannot, in all cases, be realized due to the difficulty of establishing the proper adherence and positioning of the tensile section with respect to the body of the belt, at least under known treating and building methods.

As a consequence, the present invention is designed to avoid the aforementioned difficulties by means of a novel method and construction for use in the manufacture of power transmission belts. As an example, in positive drive, or cog type belts, a way of accurately positioning and incorporating the tensile section into the body of the belt in a single operation, without prior treatment of the material forming the tensile section, has been found to impart unusually good operating characteristics and to materially increase the life of the resultant belt. More specifically, the method and principle of construction of the present invention enables a more complete permeation of the material forming the tensile section by the body section than has been heretofore realized and, in doing so, makes possible several unique and distinct advantages over power transmission belts formed under present building methods. For instance, the tensile section may be given a very uniform, evenly spaced cross section from edge to edge of the belt for greatly improved stress distribution, and in such a way that the fibers or yarns forming the tension section will not tend to fray or, as mentioned earlier, become displaced or misaligned with respect to the rest of the belt, but will be maintained in predetermined position with a predetermined angle of twist throughout the life of the belt.

It is, therefore, an object of the present invention to provide for a power transmission belt, and a method for making the same, wherein the body section of the belt may be of a homogeneous material incorporating a reinforcing tensile section therein which forms an integral portion of the belt so as to properly absorb and distribute stresses and forces imposed upon the belt.

It is still another object to provide for a belt member incorporating a tensile member therein such a way as to eliminate edge fraying and gradual wearing of the belt adjacent to the edge and in general establish more accurate placement, and improved load distributing characteristics of the tensile section for greatly increased life of the belt.

It is a further object to provide for a unitary power transmission belt construction and a method of making the same in a minimum number of steps wherein the tensile section forming the load carrying member in the belt may be accurately positioned and thoroughly impregnated with and adhered to the material forming the body of the belt so as to eliminate special treatment and building methods, and at the same time to attain improved operating characteristics.

It is a still further object to provide for a cog type belt construction, together with a method of making the same, wherein the load carrying section may be accurately and integrally formed with the cogs of the belt so as to more directly absorb and carry the forces imposed on the cogs, and further, to attain improved belt life and flex fatigue characteristics.

It is an additional object to provide for a unitary power transmission belt which may incorporate into the tensile section either a natural or synthetic material wherein the fibers or yarns forming the section may be twisted and arranged at the desired angle and position respectively, under a predetermined degree of tension, then thoroughly impregnated with the material forming the belt so as to become set and maintained in the predetermined position and angle throughout the life of the belt in tightly compacted and adhering relation, and further to thereby form an integral part of the belt.

It is still an additional object to provide for a simple and reliable method for forming a power transmission belt whereby a textile, load carrying section may be more securely and thoroughly united with the body of the belt and with the fibers forming the textile section being permanently locked at the desired relative angle, and the entire section accurately, yet yieldingly positioned so as to establish improved operating characteristics of the belt.

In accordance with the present invention, it has now been discovered that the above desired characteristics and objects of the present invention may be fully realized in a novel method and belt construction in which, broadly, any normally flexible and wear resistant material, either a plastic or liquid elastomer, may be cast into desired form about a high tensile strength member, such as, a fabric or cord section or homogeneous sheet in such a way as to establish extremely good adhesion and a high degree of penetration or permeation of the fabric or cord tensile section, and to accomplish the above so as to insure accurate placement and alignment of the tensile section within the belt. Of course, casting a vulcanizable material around a reinforcing member is well known, and to carry out casting under vacuum or pressure is generally well known. However, the present invention proposes improved casting techniques over those presently in use and in addition, applies these techniques in a unique manner to the manufacture of power transmission belts; and in this application provides a solution to many long standing problems and disadvantages previously encountered in practice.

Additional features and advantages of the invention will become more apparent from the following description taken in conjunction with the accompanying drawings illustrating by way of example various embodiments thereof, and in which.

Figure 1:
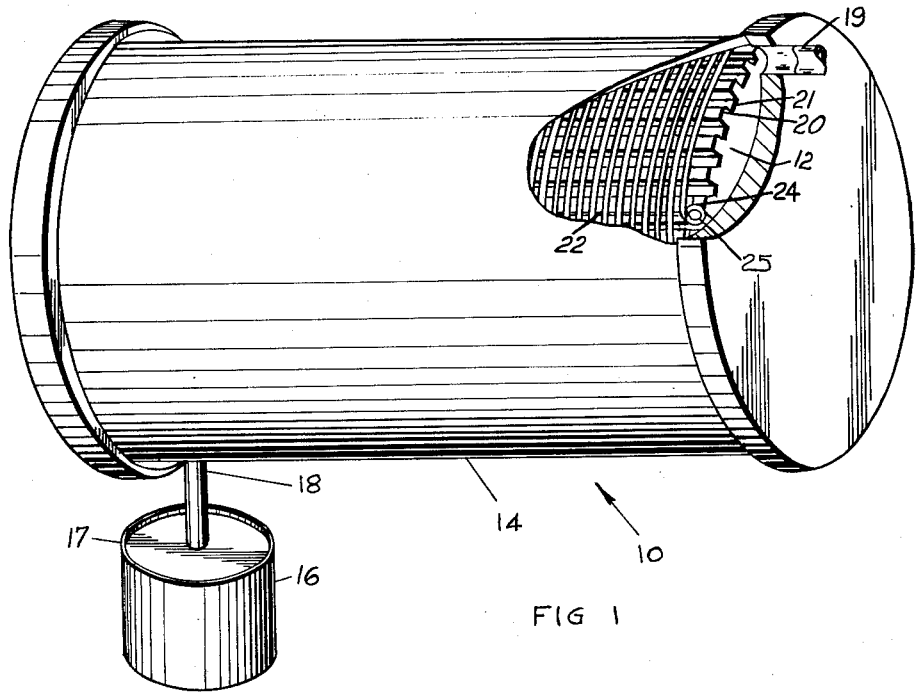
FIGURE 1 is a perspective view of a typical casting assembly for carrying out the process of the present invention with a portion of the assembly broken away to show the interior mold configuration.

With more particular reference to the drawings, there is shown in FIGURE 1, by way of illustration and not limitation, a casting assembly 10 comprised broadly of an interior mandrel or drum 12 and an outer spaced, concentric vacuum jacket or chamber 14, along with a vessel or pressure pot represented at 16, having a liquid elastomer 17 contained therein with an inlet tube 18 extending into the vessel 16 and from the annular space provided between the mandrel 12 and outer chamber 14. Also, at the other end of the assembly is a vacuum or exhaust line 19 to establish communication between the annular space in the assembly and a vacuum pump (not shown). As will be further noted, the drum or mandrel 12 may be corrugated preferably by the formation of a series of evenly spaced ridges 20 and alternating grooves 21 extending about the periphery of the drum in a direction parallel to the longitudinal axis of the drum. In the casting assembly as shown, the grooves 21 are of a configuration to constitute a mold for forming the tooth elements of a cog type belt construction, and the entire mandrel is of a length to enable the formation of a continuous belt band which may be skived into the desired number of belts of a predetermined width, all in a well known manner.

In carrying out the method of the present invention, and prior to insertion of the drum 12 within the chamber 14, a tensile section or strain resisting member 22 may be wound around the mandrel in direct contact with, and supported by, the series of peripheral ridges 20. As shown, this tensile section may comprise a single, continuous layer of cords, which may be formed by winding a cord snugly and evenly around the mandrel preferably under a predetermined degree of tension from one end to the other with ends 24 of the cord being suitably tied or supported at the end of the mandrel by means of a conventional pin 25, or by other suitable means. In this connection, it is to be noted that no other splicing arrangement is utilized; in addition, the cord, such as, a cotton or synthetic cord of high dimensional stability, need not be processed or pretreated in any way prior to wrapping onto the drum.

The drum 12 may be encased or inserted within the outer vacuum jacket 14, which is then completely sealed from atmospheric pressure so that a high vacuum can be obtained within the jacket. The liquid elastomer material 17, to be hereinafter described in more detail, is first thoroughly degassed, then collected or poured into the vessel 16, after which the entry tube 18 may be lowered into the pressure pot 16. In addition, the annular space within the chamber is also completely evacuated prior to entry of the elastomer 17 so as to eliminate any trapped air in the void space between the ridges or within the cord material itself, which may otherwise tend to cause nonfills in the resultant belt construction, or lack of penetration into the tensile member. For this purpose, the entry tube 18 may be closed off by a suitable valve (not shown) to evacuate the annular space for the removal of entrapped air therefrom, then the valve may be opened to induce flow of the elastomer material 17 through the annular space. Thus the vacuum pump (not shown) will serve to properly prepare the tensile section for the casting process and will also serve to induce the flow of elastomer material throughout the mold. In order to properly gauge the necessary extent of flow of material into the annular space to completely fill it, a viewing window may be provided at the opposite end adjacent the vacuum line to observe when the liquid initially begins to flow around the corresponding end of the drum, or, alternatively, the flow may be set for a predetermined length of time under a predetermined vacuum pressure to carry out the casting and belt forming process. As an added alternative, the drum and entire outer chamber may be disposed vertically, with the entry tube at the bottom and vacuum exhaust line 19 at the top so as to insure complete filling of the annular space when the liquid material flows evenly over the upper end of the drum. In this connection, it has been noted and observed that as the liquid is caused to flow into the cavity or annular space under vacuum, and with complete degassing of the liquid material and pre-evacuation of the annular space, the liquid tends to flow thoroughly and completely into the void spaces defined by the alternating ridges 20 and grooves 21. In addition, although the cord has been tightly wrapped around the mandrel, the material will nevertheless tend to form a film between the cord and ridges 20. Moreover, the liquid material further completely penetrates or impregnates the cord layer; that is, it completely surround each of the fibers or filaments forming the individual yarns of the cord, completely filling any of the interstices between the fibers, and in this way upon setting maintains the yarn in the desired position and angle; and also, forms a continuous body section extending around the fibers or filaments so as to hold them closely together and, in effect, unites or integrates the cord section itself into the body so as to form a unitary belt construction.

Following the casting operation, the belt band formed on the mandrel may be cured in a conventional manner, such as, by placing the mandrel 12 and the jacket 14 in a curing oven or other suitable means for the necessary length of time, depending upon the type of elastomer material and size of the belt. Following vulcanization and cooling of the band, it may be removed from the mandrel, and a conventional slitting or cutting operation employed to cut the band into individual belts.

Figure 2:
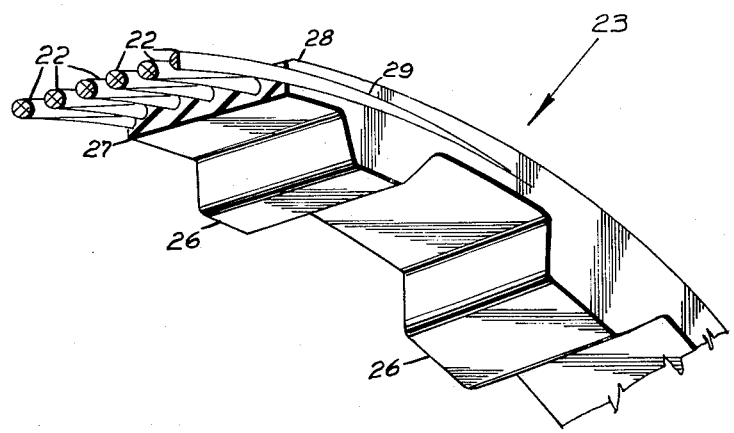
FIGURE 2 is a fragmentary, perspective view of a preferred form of power transmission belt, in accordance with the present invention.

The resultant belt construction is shown in FIGURE 2, wherein it will be noted that a positive drive belt 23 is comprised of the continuous layer of evenly spaced cords 22 forming a tensile section extending along the dedendum circle and base of a plurality of tooth elements 26. A thin film 27 on the underside of the cords and between the tooth elements 26, and an overcord section 28, completes the belt construction. From the drawing, it will be further noted that the tooth elements 26, together with the thin layer or film 27 and overcord layer 28, form in combination a body section of a homogeneous material wherein the material completely permeates the cord or tensile section and wherein no other materials or adhesives are present. In addition, during the cutting or slitting operation, the belt may be cut at any desired width without regard to the disposition of the cords, and if necessary and as shown, a portion of a cord strand may be cut as illustrated by an edge cord 29, yet there is no danger of edge fraying in operation due to the complete permeation of the cords by the elastomer material.

In the above described casting process, various liquid elastomers or organic plastic materials may be employed, such as, plastisol, liquid neoprene, liquid thiokols, polyester resins, epoxy resins, together with any others. For example, particularlarly good results have been obtained with the use of a polyurethane rubber which possesses excellent properties including exceptionally high tensile strength, tear resistance, abrasion resistance, oil resistance, and ozone resistance, which are very desirable in power transmission belt applications. In addition, the resultant cured rubber-like product may be made very flexible, together with other desired properties by proper mixing of other compounding ingredients. One such polyurethane rubber, sold under the trade name Adiprene L, may be prepared in the following manner: 100 parts of isocyanate resin derivative may first be heated approximately at a temperature of 70° C. to make fluid, after which it may be degassed by evacuation of the air within a suitable vacuum chamber. 20 parts of a plasticizer, such as dioctyl phthalate, may then be mixed in for softening and improved flowability. Generally a polyfunctional compound containing active hydrogens may be used as a curing catalyst. For this purpose, 11 parts of a 4, 4' methylene bis (2 chloraniline) sold under the trade name Moca, has been found suitable and may be first heated, then mixed and degassed with the other ingredients prior to pouring into the pressure pot 16. The outer vacuum jacket may then be installed over the drum and sealed against atmospheric pressure. With the entry tube 18 closed, the cavity formed between the drum 12 and jacket 14 is evacuated for a length of time sufficient to insure removal of entrapped air and other gases and fluids.

When the pressure pot 16 is properly positioned in place as shown in FIGURE 1 and the cavity completely evacuated, the entry tube 18 is opened and the vacuum pump operated for an additional time to induce the flow of the polyurethane rubber into the cavity so as to completely fill the spaces surrounding the spiral cord material and to completely permeate the material. As mentioned, this may be accomplished by setting the vacuum operation for a preset length of time at a predetermined pressure in accordance with the type of elastomer, or by actually viewing the operation to determine when the cavity has become completely filled. It has been found that at this point uniform and thorough filling of the cavity is accomplished due to the careful control of the materials and cavity to remove the entrapped air and other gases. With the addition of the plasticizer in this operation of course ample time is allowed for inducing the flow into the cavity before the material will begin to set. Following the introduction of the elastomer into the cavity the assembly may be placed in a curing oven and cured for about 4 hours at 70° C. during which time cross linking will take place between the ingredients forming the polyurethane, and it is also suspected that the ingredients will react to some extent with the cord material and exhibit a limited extent of chemical cross linking for improved adhesion therewith. After curing for the necessary length of time the assembly is removed from the oven, allowed to cool, and then the drum is removed from the vacuum jacket followed by removal of the belt band from the jacket. In this connection, it is, of course, desirable to apply some lubricant prior to casting to the inner surface of the vacuum jacket and outer surface of the drum for ease of removal of the drum and belt band. The band may then be cut or slit in a continuous manner to provide a number of belts of the desired width. Alternatively, the assembly may be given a short cure at high temperature to set the elastomer; the sleeve of belts alone may then be further cured in an oven as desired to complete the curing operation, or may be left at room temperature for a sufficient length of time to develop optimum physical properties.

In addition, it will, of course, be evident that pigments may be added to the ingredients during the compounding operation. When fillers, coloring compounds, and other pigments are used they should be milled into the prepolymer or the plasticizer prior to the incorporation into the polyurethane to obtain optimum dispersion of the pigments and to make the final mixing simpler.

In general, if the material proves to be too viscous for proper flow into the chamber, exterior pressure may be applied in combination with the vacuum to the reservoir of liquid elastomer 17 by application of exterior pressure into the pressure pot 16, thus giving a greater differential pressure than that established between atmospheric pressure and the working vacuum, so as to completely fill the spaces and impregnate the cord section.

Figure 3:
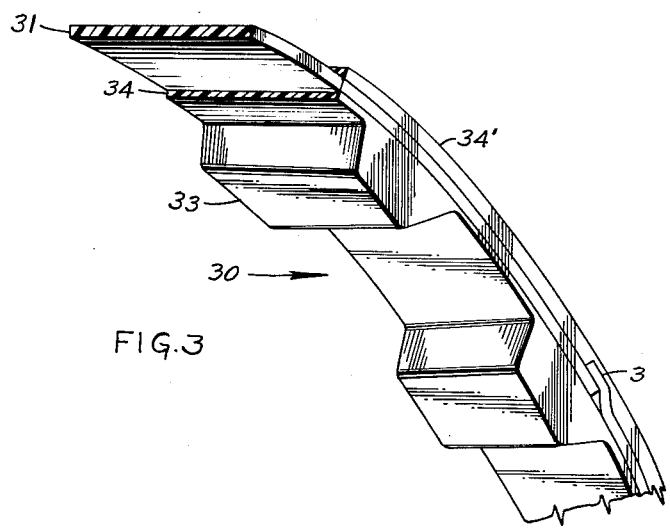
FIGURE 3 is a fragmentary, perspective view of a modified form of the present invention.

By proper control and selection of the liquid elastomer material, together with proper preparation of the mold and material so as to release any entrapped air, along with the cross linking action which takes place during curing within the polymer surrounding the cord or tensile section the tensile layer becomes firmly adhered to the body and the strands are locked at a predetermined position and angle. Moreover, the tensile layer may be tightly wound upon the drum under tension, and it has been discovered that the elastomer will permeate the tensile layer to such an extent as to form a uniform film during casting between the layer and the ridges 20, and moreover will hold the layer in tension and tightly compact relation so as to materially increase its flex fatigue characteristics and over-all life. And in this connection it has been found that the elastomer material will attain a very high degree of impregnation with many types of wire, or textile fibers and yarns, such as, Dacron, cotton, nylon, rayon, fortisan and others, and is not dependent upon the properties of the tensile section itself to attain the desired result. For example, there is shown in FIGURE 3 a cog type belt construction prepared in accordance with the casting method of the present invention, wherein a nylon sheet tensile section 31 may be employed in place of the cord section 22 as shown in FIGURE 2. In the winding operation, of course, the nylon tensile section 31 may be wrapped in a single sheet around the drum 12, with the ends merely disposed in overlapped relation as shown at 32, and adhered or joined together in preparation for the casting operation. Of course, for heavy duty applications the tensile sheet layer may be wound a number of times about the drum to form several overlapping layers so as to eliminate any possible weak section in the belt and the elastomer will serve to firmly and permanently dispose the layers in the desired position. The nylon or other synthetic material may also be slipped over the mandrel 12 in the form of a tube so as to form an endless section and to eliminate the necessity of a splice. The tube (not shown) may be of a diameter equal to the drum, or if desired may be prestressed using a tube diameter slightly less than the drum and radially expanding the tube for slipping onto the drum surface.

Again, the belt upon casting is comprised of tooth elements 33, a thin film 34 underlying the belt tensile section, and a section 34' overlying the tensile layer 31. Although the nylon or Dacron may be a relatively dense material, nevertheless good penetration and adherence is obtained by the use of the castable liquid elastomer material together with the high vacuum applied thereto as it is introduced into the mold. Moreover, the tensile section may again be formed directly at the base of the tooth elements, and in such a way as to be in direct connected relation with the elements without the necessity of applying a cover or wrap over the teeth and base of the teeth as is commonly necessary in present belt construction.

Figure 4:
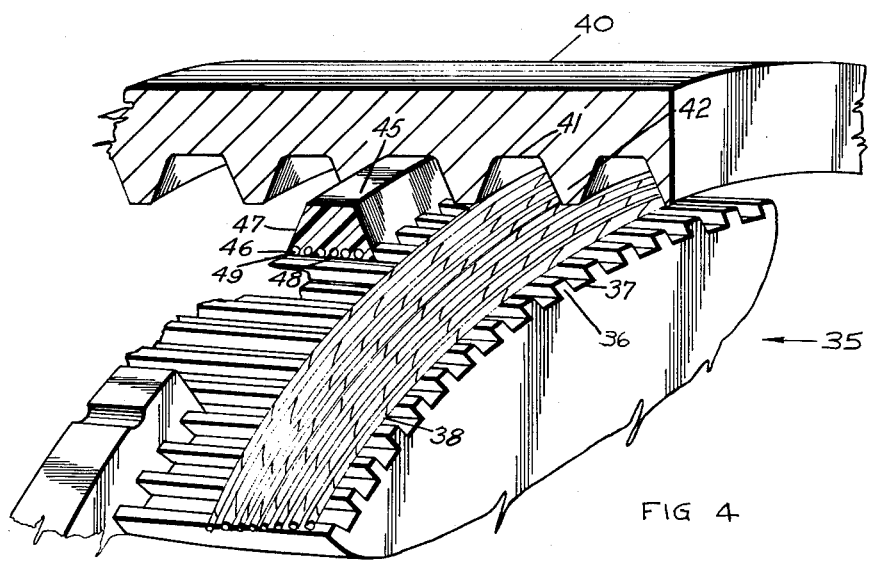
FIGURE 4 is a fragmentary, perspective view of a V-shaped belt mold for use in a casting assembly, together with a V-belt cross section formed in accordance with the present invention.

To illustrate the application of the present invention to the construction of other types of power transmission belts, there is shown in FIGURE 4 a mold cross section which may be utilized in the formation of a cast V-belt structure. In the formation of V-belts, of course, the tensile section is located in the upper section of the belt and away from the lower contacting surfaces thereof. For this reason, the belt in the casting operation may be formed in inverted fashion in the following manner: As shown in FIGURE 4, a drum 35 is provided, having a corrugated peripheral surface defined by a series of alternating ridges 36 and grooves 37. In this connection, however, it is to be noted that the corrugated surface in the formation of a V-belt construction performs no other service than to support a cord layer 38 forming the tensile section of the belt. For this reason, the corrugated surface may be of any desired configuration depending upon the design desired along the top of the belt, such as a sawtooth configuration or cross rib design, or siping spaced along the top surface of the belt. The cord section may then be applied or wound upon the drum 35 in a manner similar to that described with reference to FIGURE 1, so that the cords will be tightly placed against the ridges 36, and evenly spaced therealong throughout the length of the belt. In place of the smooth inner surface of the vacuum jacket 14 described in connection with the method of making cog type belts, an outer multiple cavity mold 40 containing a plurality of spaced trapezoidal or generally V-shaped cavities 41, separated by downwardly extending trapezoidal or generally V-shaped ridges 42, may then be placed around the cord wrapped mandrel 35. When properly sealed, the liquid elastomer, such as the degassed liquid polyurethane rubber, is forced into the annular space between the mandrel 35 and the outside mold 40 in the manner described with reference to the cog type casting process. After filling the cavity, the assembly may then be cured in a conventional manner and upon removal of the belt section from the drum, each of the sections may be cut through the belt cord area and the overcord section in order to provide the proper dimensions. With further reference to FIGURE 4, there is illustrated a finished belt 45, shown inverted, provided with a tensile section 46 formed by the cords 38, together with an undercord section 47 and a rib shaped overcord section 48. In addition, it will further by observed that the liquid elastomer material will tend to completely permeate the cord section and to form a thin film 49 between the cord layer and contacting surface of the ridges 36. In this way, the cord section may be incorporated into the body of the belt in a single casting operation and yet be protected from exposure by the body material.

It will, of course, become evident from the foregoing, that the hereinbefore described process has application to various types of V-belt constructions other than those particularly described.

Essentially, the invention may be seen to consist of the substantially complete permeation of the tensile section by means of introducing a specially prepared liquid elastomer material under vacuum and pressure, if desired, wherein exceedingly close control is utilized in the removal of entrapped fluids from the materials and mold prior to casting to obtain the desired adherence and uniting of the reinforcing section within the body. In addition, prestressing the tensile section followed by complete removal of any fluid and the casting of the material about the layer to hold it in prestressed condition would appear to materially increase fatigue resistance, particularly the synthetics. It may be, also, that some interlocking takes place during the curing operation between the liquid elastomer and the tensile section so as to obtain greatly improved adhesion and integration of the tensile section into the belt and thus secure greatly increased life. In addition, the belt building process is greatly simplified over existing methods, permits the use of a single homogeneous material to form the body section in combination with a tensile section of some suitable reinforcing material to provide the desired tensile strength and with or without prior treatment of the textile material. An added important feature of the present invention is the extent to which the fiber angles may be controlled by complete permeation of the tensile section by the liquid elastomer so as to lock the fibers at the desired angle throughout the life of the belt. It is evident that this also contributes greatly to increase in life and more satisfactory running performance of the belt. Moreover, and upon curing, the resultant belt construction exhibits almost negligible shrinkage and thus permits accurate dimensioning to the desired belt size. Also, the belt is not adversely affected by storage for extended periods and exhibits good stability, due to a high degree of penetration, and moisture problems are very largely eliminated.

It will also be noted that by the complete elimination of entrapped air, moisture, and other gases from the material, all void spaces are eliminated and the tensile layer is free from attack by undesirable agents. Moreover, it is apparent that the belts formed may be combined with other materials if desired, such as, an outer fabric wrapper, although as mentioned, such is not essential and the elastomer material may provide the desired wear qualities and strength. However, it is to be understood that the invention is not to be limited to a belt consisting only of a textile reinforcement in combination with a castable material and that the above materials may be combined with others and nevertheless fall within the scope of the present invention. In addition, belts of various types and configurations which are adaptable for different applications may be formed in accordance with the present invention, such as, flat or conveyor belting. For example, in place of a corrugated drum or mandrel, a drum providing a smooth surface may be employed and the tensile material applied in the desired manner to the surface of the drum. The castable material may then be induced to flow, as before, in and around the tensile material and will form a film between the drum surface and tensile layer so as to protect the tensile layer from exposure. Of course, various other mold shapes may be utilized in the process for making a belt construction of the desired shape.

Accordingly, the foregoing detailed description has been given for the purposes of illustration only, and is not intended to limit the scope of the present invention, which is to be determined from the appended claims.

We claim:

1. A unitary vacuum molded power transmission belt comprising: a body section composed of a homogeneous castable elastomer material, and a fibrous tensile layer incorporated in said body section, said castable elastomer material completely penetrating said tensile layer uniformly throughout and completely filling the interstices formed by the fibers to intimately unite said fibers into predetermined alignment and position within said body.

2. The belt according to claim 1 wherein said body section is characterized by a thin film covering said tensile layer at spaced intervals along one side thereof.

3. A unitary power transmission belt comprising: a body composed of a homogeneous castable elastomer material, and a prestressed tensile layer incorporated into said body section, said layer being formed of a synthetic fibrous sheet tensile band, and said castable material extending continuously throughout said fibrous band to hold and intimately unite said band in prestressed, tightly adhered position within said body.

4. A unitary power transmission belt according to claim 3 in which said body includes a plurality of tooth elements defining integrally formed continuations of said body section, said fibrous band being disposed to lie at the neutral axis of said tooth elements with a thin film of said elastomer material covering said band between said tooth elements.

5. In a vacuum molded positive drive belt including a plurality of load-transmitting elements composed at least in part of a castable material vacuum molded to form an integral portion thereof: a fibrous tensile layer extending along the base of said elements, said fibrous layer being impregnated throughout with the interstices of the fibrous tensile layer completely filled by said castable material so as to be associated with said elements in unitary, tightly adhering relation and to provide for the direct and uniform distribution of stresses imposed on said elements into said tensile layer.

6. In a vacuum molded positive drive belt according to claim 5 wherein said tensile layer consists of a continuous layer of evenly spaced fibrous cords.

7. A vacuum molded endless, unitary belt comprising a castable polyurethane elastomer material defining a flexible, wear resistant body section of generally trapezoidal cross section, and a load carrying, high strength fibrous tensile layer incorporated along the neutral axis of said body section, said fibrous tensile layer being held in direct, tightly adhering relation with said body by the penetration of said castable polyurethane elastomer material throughout said fibrous tensile layer with the interstices formed by the fibers being completely filled with said castable ployurethane material.

8. In a power transmission belt vacuum molded from a castable material: a fibrous tensile section comprised of load carrying members and a body portion comprised of a castable material vacuum molded into a direct tightly adhering relation with said castable material completely impregnating said fibrous tensile section and filling the interstices formed by fibers in the tensile section.

9. A vacuum molded unitary power transmission belt comprising: a castable elastomer material vacuum molded to define a flexible wear resistant body section comprising an inner compression body portion and an outer tension body portion comprising a thin film of elastomer with spaced apart transverse ribs; and a tensile layer of fibrous cords incorporated within said body section during molding and disposed at the neutral axis between said outer tension portion and said inner compression portion, said elastomer material completely impregnating said fibrous cords and completely filling the interstices of the cords and holding said cords in a tightly adhering relation within said body section.

10. The belt according to claim 9 wherein said body comprises: a plurality of tooth elements defining the inner compression body portion, said cords lying along the base of said tooth elements with a film of said elastomer covering the inner side of said cords at the spaced intervals between said tooth elements and with a film of said elastomer covering the outer side of said cords at the intervals between the spaced apart transverse ribs.

11. A vacuum molded unitary power transmission belt comprising a castable polyurethane rubber material vacuum molded to define a flexible wear resistant body section comprising an inner compression body portion and an outer tension body portion comprising a thin film of polyurethane rubber material with spaced apart transverse ribs; a tensile layer of fibrous cords incorporated within said body section during molding and disposed at the neutral axis between the outer tension portion and the inner compression portion, said polyurethane rubber completely impregnating said fibrous cords and completely filling the interstices of the cords and holding said cords in a tightly adhering relation within said body section.

References Cited in the file of this patent

UNITED STATES PATENTS

| 2,507,852 | Case | May 16, 1950 |
| 2,831,359 | Carle | Apr. 22, 1958 |
| 2,983,637 | Schmidt | May 9, 1961 |
| 3,068,710 | Beckdolph et al. | Dec. 18, 1962 |
| 3,078,206 | Skura | Feb. 19, 1963 |
| 3,083,583 | Szonn | Apr. 2, 1963 |

FOREIGN PATENTS

| 131,653 | Switzerland | May 16, 1929 |